July 3, 1956
L. W. PONIATOWSKI
2,752,718
FISHING BAIT
Filed July 28, 1950
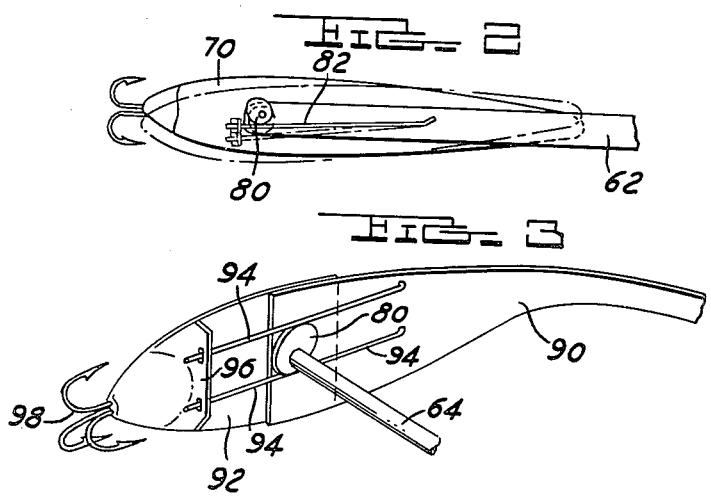
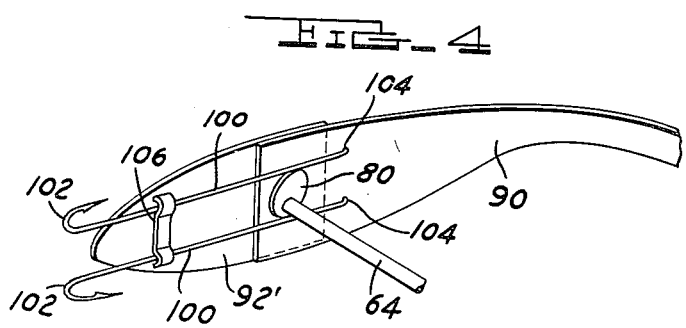
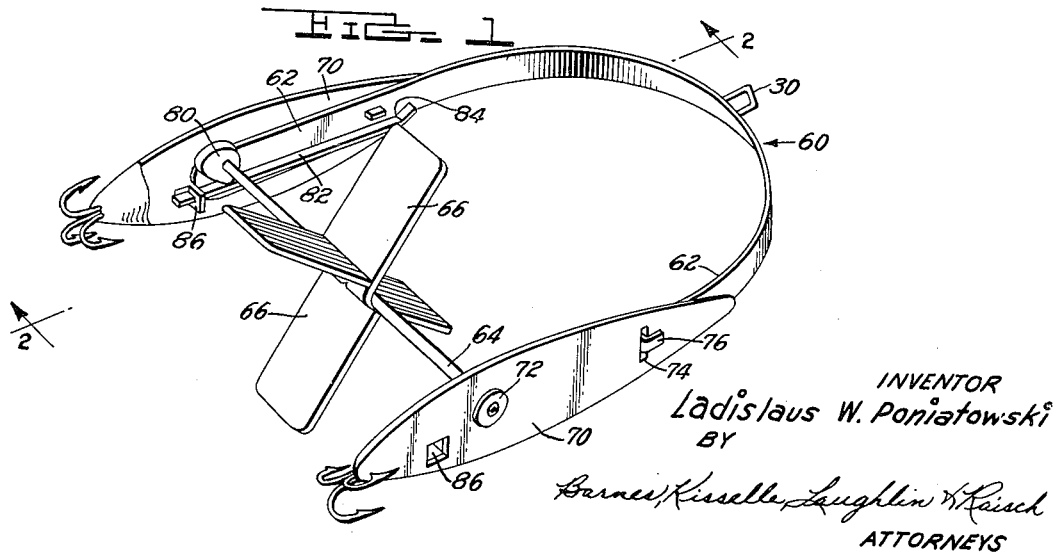
INVENTOR
Ladislaus W. Poniatowski
BY
Barnes, Kisselle, Laughlin & Raisch
ATTORNEYS

United States Patent Office 2,752,718
Patented July 3, 1956

2,752,718

FISHING BAIT

Ladislaus W. Poniatowski, Detroit, Mich.

Application July 28, 1950, Serial No. 176,312

7 Claims. (Cl. 43—26.2)

This invention relates to a fishing bait.

It an object of the invention to provide a trolling bait having a moving part which simulates a live fish as the bait passes through the water.

Briefly, this invention consists of a framework having a spin wheel mounted therein which rotates cams for oscillating fish shaped panels on the frame as it is drawn through the water.

Other objects and features of the invention relating to details of construction and operation will be apparent in the following description and claims.

Drawing accompany the specification, and the various views thereof may be briefly described as:

Figure 1, a perspective view of one embodiment of the invention.

Figure 2, a fragmentary view taken on line 2—2 of Figure 1.

Figures 3 and 4 are fragmentary views showing additional modifications of a motion mechanism for a movable side plate.

In Figure 1 a device is shown having a U-shaped band or frame member 60 formed with side legs 62 joined by a return bent portion. A fastening loop 30 provides an attachment location for the bait. An axle 64 joins the side legs and mounted thereon is a rotor consisting of two L-shaped blades 66 joined to the rotor to provide a four-bladed unit. The axle 64 projects through the side members 62 and provides mounts for side panels 70 which are fashioned to simulate the body of a fish. A washer 72 is loosely mounted on the axle 64 and serves as a retaining washer and also may be colored in contrast to the end of the axle to simulate the eye of a fish which will move in rotation and create the effect of life. A slot 74 in the side of panel 70 receives a struck-out lug portion 76 which is bent over to form guide means to stabilize the action of the forward end of panel 70 as it oscillates on the axle 64.

This oscillating motion is created by a cam 80 mounted to rotate with axle 64 working on an actuating member 82 mounted at 84 on side plate 62 as by welding and projecting through a tab 86 on panels 70. The member 82 can be a spring member which tends to restore the panels to their original position against the action of the cam.

The rotor 66 in Figure 1 is shown for purposes of illustration, and this rotor may be also constructed in other ways. For example, a cam may be formed as a part of the rotor at the ends.

In Figures 3 and 4 additional actuating means are shown. On a side member 90 an oscillating panel 92, 92' may be mounted for oscillation about the axis of the axle 64, and the actuating means in the case of Figure 3 consist of two pin members 94 pivoted in parallel relation at one end on body 90 and fastened at the other end to a small flange 96 extending from the side panel 92. In this case the cam 80 contacts both pins 94 at the same time and it controls completely the motion of the side panel.

In Figure 3, a separate three-hook member 98 is provided on the nose end of the plate 92 which is fashioned to simulate a fish.

In Figure 4, the actuating member consists of shafts 100 of hooks 102, which shafts are pivoted at 104 on the body and positioned by a small clamp member 106 on the panel. This arrangement has the advantage that the strike force on the hooks is transmitted directly to the body 90.

What I claim is:

1. A fishing bait for use in trolling or casting which comprises an open center frame body member, panel means mounted on the sides of said body member for oscillating motion having a portion simulating a portion of a fish, rotary means on said body member mounted to have rotary motion imparted thereto as the bait is drawn through the water, parallel actuating members pivotally connected at one end to said body member and fastened at the other end to said panel means, and means connecting said rotary means and said actuating member to translate the rotary motion of the rotary means into the oscillating motion of the panel.

2. A fishing bait for use in casting and trolling which comprises a body member, a rotary means mounted on said body member in such a manner as to have rotary motion imparted thereto as the same is drawn through the water, a panel means mounted on said body member having an oscillating motion about the same axis as the rotary means and having a portion shaped to simulate the body of a fish, parallel actuating means pivotally connected at one end on said body and at the other end to said panel means, and a cam means mounted on said rotary means adapted to contact simultaneously said parallel actuating means to translate the rotary motion of the rotary means into the oscillating motion of the panel means.

3. A fishing bait as defined in claim 2 in which the actuating means comprises the shank of hooks projecting beyond the panel means.

4. A fishing bait for use in casting and trolling which comprises a frame member having two spaced apart legs joining in a curved return-bent portion, fish simulating panels on the outer sides of the legs of said frame member, a water actuated rotor mounted in the space between said side panels and means associating said rotor and said side panels wherein movement of said rotor results in oscillating motion which is transmitted to said side panels, said means consisting of a cam member mounted on the axle of the rotor and a cam actuated member having one end mounted on said panels and the other end mounted on said frame.

5. A fishing bait for use in casting and trolling which comprises a frame member having two spaced apart legs joining in a curved return-bent portion, fish simulating panels on the outer sides of the legs of said frame member having apertures formed therein, a water actuated rotor mounted in the spaced between said side panels and means associating said rotor and said side panels wherein movement of said rotor results in oscillating motion which is transmitted to said side panels, and guide means on said frame interlocking with the apertures in said side panels to stabilize the forward end of the side panels.

6. A fishing bait for use in casting and trolling which comprises a frame member in the form of a band having two spaced apart legs joining in a curved return-bent portion, fish simulating panels on the outer sides of the legs of said frame member, a water actuated rotor mounted in the space between said legs and forming a closed U therewith, means associating said rotor and said side panels, whereby movement of said rotor results in oscillating motion being transmitted to said side panels, and interengaging means on the side panels of the frame member for stabilizing the front end of said side panels.

7. A fishing bait for use in casting and trolling which comprises a frame member in the form of a band having two spaced apart legs joining in a curved return-bent portion, fish simulating panels on the outer sides of the legs of said frame member, a water actuated rotor mounted in the space between said legs and forming a closed U therewith, and means associating said rotor and said side panels, whereby movement of said rotor results in oscillating motion of said last named means, which is transmitted to said side panels.

References Cited in the file of this patent

UNITED STATES PATENTS

| Number | Name | Date |
|---|---|---|
| 996,793 | Pickett | July 4, 1911 |
| 1,533,022 | Mead | Apr. 7, 1925 |
| 1,666,072 | Schilpp | Apr. 17, 1928 |
| 2,229,175 | Johnson | Jan. 21, 1941 |
| 2,347,609 | Phillips | Apr. 25, 1944 |
| 2,472,505 | Yocum et al. | June 7, 1949 |
| 2,478,655 | Davis | Aug. 9, 1949 |
| 2,517,495 | Kneece | Aug. 1, 1950 |
| 2,534,639 | Twist | Dec. 19, 1950 |